United States Patent
Lemke et al.

(10) Patent No.: US 8,933,581 B2
(45) Date of Patent: Jan. 13, 2015

(54) METHOD AND ON-BOARD VEHICLE POWER SUPPLY SYSTEM FOR PREDICTIVELY INCREASING THE ON-BOARD VEHICLE POWER SUPPLY SYSTEM VOLTAGE

(75) Inventors: Olaf Lemke, Munich (DE); Martin Hauschild, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 972 days.

(21) Appl. No.: 12/435,790

(22) Filed: May 5, 2009

(65) Prior Publication Data

US 2009/0267413 A1  Oct. 29, 2009

Related U.S. Application Data

(63) Continuation of application No. PCT/EP2006/010590, filed on Nov. 6, 2006.

(51) Int. Cl.
   *B60L 1/00* (2006.01)
   *B60L 3/00* (2006.01)
   *H02G 3/00* (2006.01)
   *B62D 5/04* (2006.01)

(52) U.S. Cl.
   CPC ............... *B60L 1/003* (2013.01); *B62D 5/0457* (2013.01); *B62D 5/046* (2013.01)
   USPC ...................................................... 307/10.1

(58) Field of Classification Search
   USPC ......................................... 307/10.1; 180/446
   See application file for complete search history.

(56) References Cited

U.S. PATENT DOCUMENTS

| | | | |
|---|---|---|---|
| 4,762,194 A * | 8/1988 | Morishita et al. | 180/446 |
| 5,535,123 A | 7/1996 | Rump et al. | |
| 2002/0020381 A1 | 2/2002 | Pels | |
| 2007/0252559 A1 | 11/2007 | Uhl | |

FOREIGN PATENT DOCUMENTS

| | | |
|---|---|---|
| DE | 43 38 068 C1 | 3/1995 |
| EP | 0 360 470 A1 | 3/1990 |
| EP | 1 564 862 | 8/2005 |
| JP | 2008-282141 A | 10/2006 |
| WO | WO 00/14402 A1 | 3/2000 |

OTHER PUBLICATIONS

International Search Report dated Aug. 23, 2007 w/English translation (six (6) pages).

* cited by examiner

*Primary Examiner* — Carlos Amaya
(74) *Attorney, Agent, or Firm* — Crowell & Moring LLP

(57) ABSTRACT

A method is provided for reducing the energy consumption of a motor vehicle having at least one electric on-board power supply system to which at least one electric consuming device is connected. For implementing an efficient on-board power supply system which, in addition, contributes to the reduction of the energy consumption of a motor vehicle, the voltage level and/or power level of the electric on-board power supply system is kept at a first, low level during a first operating condition of the motor vehicle. The voltage level and/or power level of the electric on-board power supply system is temporarily raised to a second, higher level in a second operating condition of the motor vehicle. A driving situation detection device provided in the vehicle recognizes a largely directly imminent special driving situation as a result of the preceding behavior of the driver when controlling the vehicle and/or of the vehicle, in advance, and causes the voltage level and/or the power level of the electric power supply system to be temporarily raised to the second, higher level.

17 Claims, 6 Drawing Sheets

METHOD AND ON-BOARD VEHICLE POWER SUPPLY SYSTEM FOR PREDICTIVELY INCREASING THE ON-BOARD VEHICLE POWER SUPPLY SYSTEM VOLTAGE

CROSS-REFERENCE TO RELATED APPLICATION

This application is a continuation of PCT International Application No. PCT/EP2006/010590, filed Nov. 6, 2006, the entire disclosure of which is herein expressly incorporated by reference.

BACKGROUND AND SUMMARY OF THE INVENTION

The invention relates particularly to a method for reducing the energy consumption of a motor vehicle having at least one electric on-board power supply system to which at least one electric consuming device is connected.

The number of electric consuming devices in motor vehicles has increased considerably. In order to reduce the $CO_2$ emission in the vehicle, hydraulically operating consuming devices are being replaced by electric consuming devices. Thus, as required, for example, an electric steering system (EPS) replaces the hydraulic steering of the motor vehicle. However, such electric consuming devices make high power demands on the vehicle power supply system for a short time. This results in a high demand on the overall stability of the vehicle power supply system. In particular, in the case of high demands occurring for short periods of time, a sufficiently high electric voltage or electric power has to be made available.

It is an object of the invention to provide a method of implementing an efficient on-board power supply system and, in addition, permitting the reduction of the energy consumption of a motor vehicle.

This object is achieved by a method and an on-board power supply for reducing the energy consumption of a motor vehicle having at least one electric consuming device connected to the on-board power supply. The voltage level and/or power level of the electric on-board power supply system is kept at a first, low level during a first operating condition of the motor vehicle. The voltage level and/or power level of the electric on-board power supply system is temporarily raised to a second, higher level in a second operating condition of the motor vehicle, and a driving situation detection device provided in the vehicle recognizes a largely directly imminent special driving situation as a result of the preceding behavior of the driver when controlling the vehicle and/or of the vehicle in advance and causes the voltage level and/or the power level of the electric power supply system to be temporarily raised to the second, higher level. Advantageous further developments of the invention are described herein.

An essential aspect of the invention consists of the fact that the voltage level and/or power level of the electric on-board power system is held at a first, low level in a first operating condition of the motor vehicle. In this first operating condition, the energy consumption and therefore the $CO_2$ emission are reduced.

In a second operating condition, the voltage level and/or the power level of the electric on-board power supply system is temporarily raised to a second, higher level. In this second operating condition, especially "power-hungry" consuming devices or loads are supplied with a sufficiently high electric voltage and/or electric power from the on-board power supply system. These consuming devices will then react in the expected, in particular, comfortable fashion. If, for example, during a turning maneuver or during a turning operation, an electric steering system is operated only at the low voltage level and/or power level of the first operating condition, the steering will be sluggish, which causes the driver to feel insecure, particularly during a turning maneuver, which as a rule should be carried out rapidly, and therefore results in a clear loss of comfort.

In order to initiate the second operating condition sufficiently early but, for reasons of a low $CO_2$ emission in the first operating condition, only if required, according to the invention a driving situation detection device provided in the vehicle will recognize a largely directly imminent special driving situation, based on the driver's preceding behavior when steering the vehicle, ahead of time and cause the voltage level and/or power level of the electric on-board power supply system to be temporarily raised to the second, higher level. "Sufficiently early" preferably means early enough for the second operating condition to be set at the point in time of the start of the expected turning operation. "Temporarily" preferably means that the time duration is calculated such that the imminent driving situation can be mastered securely and without a loss of comfort by the driver with the participation of the corresponding electric consuming devices.

In an embodiment of the invention, it is provided that the electric consuming device is an electrically operated steering system of the motor vehicle, and the largely directly imminent special driving situation is a turning operation. This is a driving situation in which a low electric voltage may become noticeable to the driver in a particularly unpleasant fashion.

In a further development of the invention, it is provided that the position of the accelerator or gas pedal is detected by the driving situation detection device, and the electric voltage and/or the electric power is increased when the accelerator or gas pedal is largely in its rest position and at least one further driving situation occurs. This is characteristic of an imminent turning operation and, therefore, particularly informative with respect to an early detection of a turning operation.

In a further development of the invention, it is provided that the acceleration and the speed of the vehicle are detected by the driving situation detection device, and the electric voltage and/or power is increased when the acceleration of the vehicle is negative, the speed falls below a predetermined threshold value, and at least one further driving situation occurs. This is also characteristic of an imminent turning operation and supplies an important indication of an imminent turning operation.

In another embodiment of the invention, the steering angle of the electric steering system of the vehicle is detected by the driving situation detection device. The electric voltage and/or power is increased when the absolute value of the steering angle is greater than a predetermined threshold value and at least one further driving situation occurs. This may be an indication that the driver is starting to swerve and/or is starting a turning maneuver. Since many drivers swerve before a turning operation, this may possibly be another helpful criterion for recognizing an imminent turning operation sufficiently early.

In another embodiment of the invention, it is provided that the steering angle of the electric steering system of the vehicle is detected by the driving situation detection device, and the electric voltage and/or power is increased when the absolute value of the steering angle is greater than a predetermined speed-dependent steering threshold or steering angle threshold and at least one additional driving situation occurs. If the driver does not swerve before a turning operation, this characteristic of an imminent turning operation can replace the "swerve criterion" and increase the reliability of the prediction of an imminent turning operation.

In a further development of the invention, it is provided that the driving situation detection device checks whether the brake pressure is higher than a predetermined brake pressure or a tolerance pressure and, in addition, checks whether the speed is lower than a predetermined acceleration-dependent speed value or a dynamic turning threshold. This results in a further increase in the reliability of the prediction of a turning operation.

In addition, the invention provides an on-board power supply system of a motor vehicle, which has a program-controlled driving situation detection device implementing the method according to the invention. Furthermore, a program-controlled driving situation detection device is provided, which implements a method according to the invention or causes its implementation.

Other objects, advantages and novel features of the present invention will become apparent from the following detailed description of one or more preferred embodiments when considered in conjunction with the accompanying drawings.

DETAILED DESCRIPTION OF THE DRAWINGS

The method according to the invention will be explained in detail in the following by way of the flow charts using the example of a turning operation. The same reference symbols indicate the same or identically acting functions.

The starting point of the method is as follows. The motor vehicle is equipped with an electric steering system. During the manual implementation of a turning maneuver or a turning operation, the electric steering system requires a sufficiently high electric voltage. When the turning maneuver is carried out at an on-board power supply voltage that is low as a result of a $CO_2$ reduction during the operation of the motor vehicle, the steering will be sluggish. This is very unpleasant for the driver, especially in the case of a turning maneuver that has to be carried out very rapidly. By means of the exemplary method, the direct imminence of a turning maneuver can be very reliably recognized, the electric on-board supply system voltage can then be increased shortly before the turning maneuver to shortly after the turning maneuver, and can then be lowered again for another reduction of $CO_2$.

Figure 1:
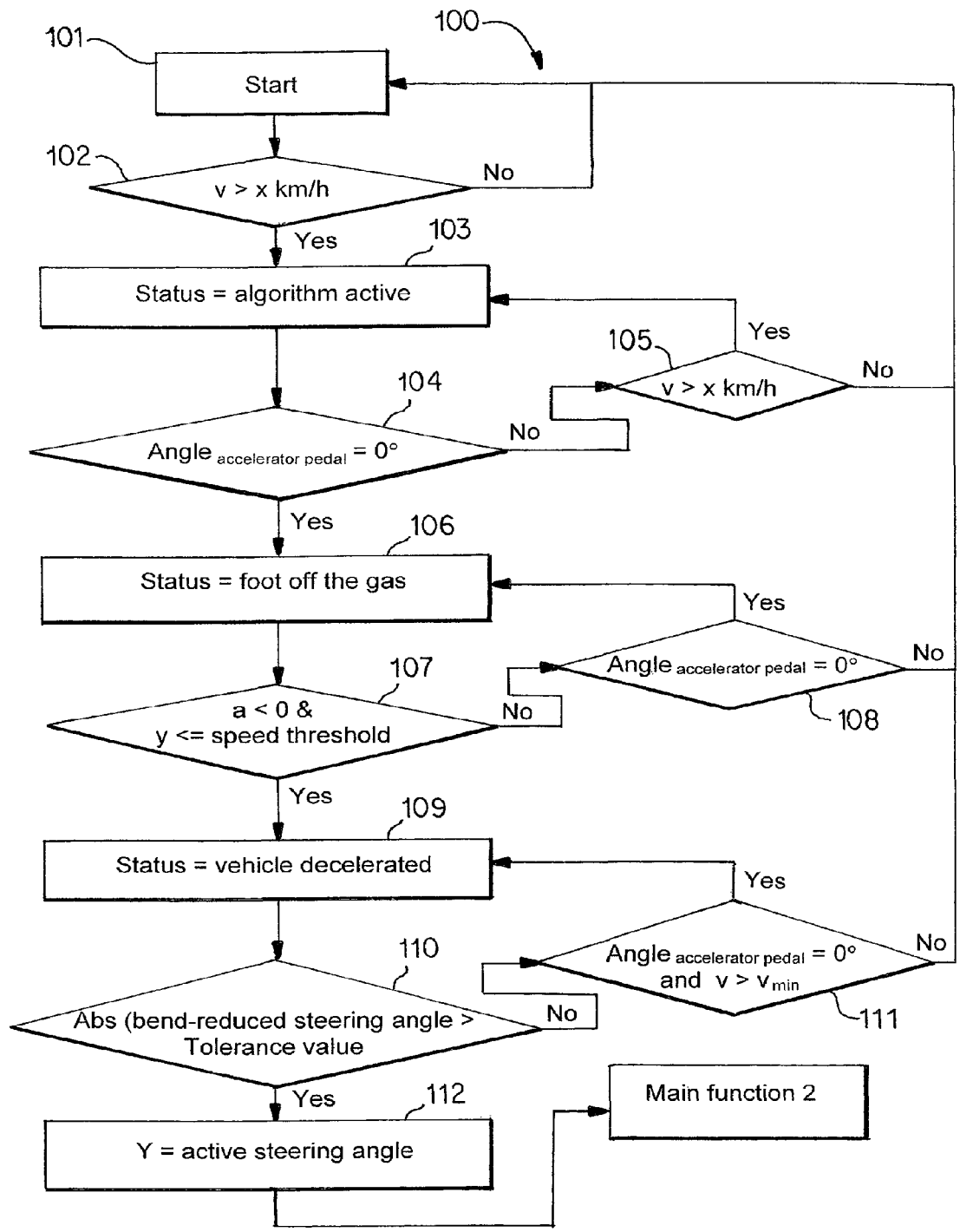
FIG. 1 is a flow chart of the main function 1 or the first part of the method according to the invention.

FIG. 1 illustrates the first part 100 (main function 1) of the method for recognizing whether the motor vehicle very will shortly carry out a turning maneuver. After starting in Step 101, in Step 102, it is compared whether the vehicle is exceeding a predetermined speed x. If the answer is "no", the comparison is made again. If the answer is "yes", the method for recognizing an imminent turning maneuver is active, as illustrated in Status 103.

In Step 104, it is compared whether the accelerator or gas pedal is operated; i.e., whether the angle of the pedal is 0 degrees (rest position). If the answer is "no", it is checked in Step 105 whether the speed of the vehicle is greater than the predetermined speed x. If the answer is "yes", Step 104 will be carried out again. If the answer is "no", the process will start again with Step 101.

If the comparison in Step 104 is positive, the status "foot off gas" is present, as indicated in Status 106.

It is compared in Step 107 whether the acceleration of the vehicle is negative (a<0) and whether the speed is lower than or equal to a predetermined speed (v<=speed threshold). If the answer is "no", the position of the gas pedal is detected again in Step 108. If the gas or accelerator pedal is not in the rest condition, the method starts from Step 101. If the gas or accelerator pedal is not deflected or operated, this is considered to be Status 106, and the comparison 107 takes place again. If the result of comparison 107 is "yes", the status of the vehicle is "vehicle decelerated" (Status 109).

The term "bend-reduced steering angle" used in the following will now be explained below. When the vehicle is moving on a straight road, the steering angle or the position of the steering wheel is 0 degrees; i.e., straight-ahead drive. When the vehicle is cornering, the steering angle differs from 0 degrees. If, for example, a uniform left-hand bend is involved, the steering angle for the duration of driving through the uniform left-hand bend is, for example, −10 degrees. In order to be able to differentiate between this type of deflection of the steering wheel (no conscious steering) and an actual steering operation (conscious steering operation) also in the case of a cornering, it is determined according to the invention how large the median steering angle was for a previous brief time period of, for example, 3 seconds, and it is determined how large the steering angle is currently. Then, the difference is established between the median steering angle and the current steering angle. This difference is the bend-reduced steering angle.

In Step 110, a comparison takes place as to whether the absolute value of the bend-reduced steering angle is greater than a tolerance value; i.e. "Abs (bend-reduced steering angle)>tolerance value". A driver will always slightly turn the steering wheel back and forth when he is driving, without thereby wanting to steer.

If the answer is "no", it is checked in Step 111 whether the gas or accelerator pedal is not deflected and the speed of the vehicle is greater than a predetermined minimal speed. If the answer is "yes", the vehicle is in Status 109. If the answer is "no", the method will start again with Status 101 "Start". If the result of Step 110 is "yes", the current steering angle y is noted in Status 112, and it is assumed that the first part of a "swerve" could have been caused by the driver. Subsequently, the continuation takes place with the main function 2 illustrated in FIG. 2.

Figure 2:
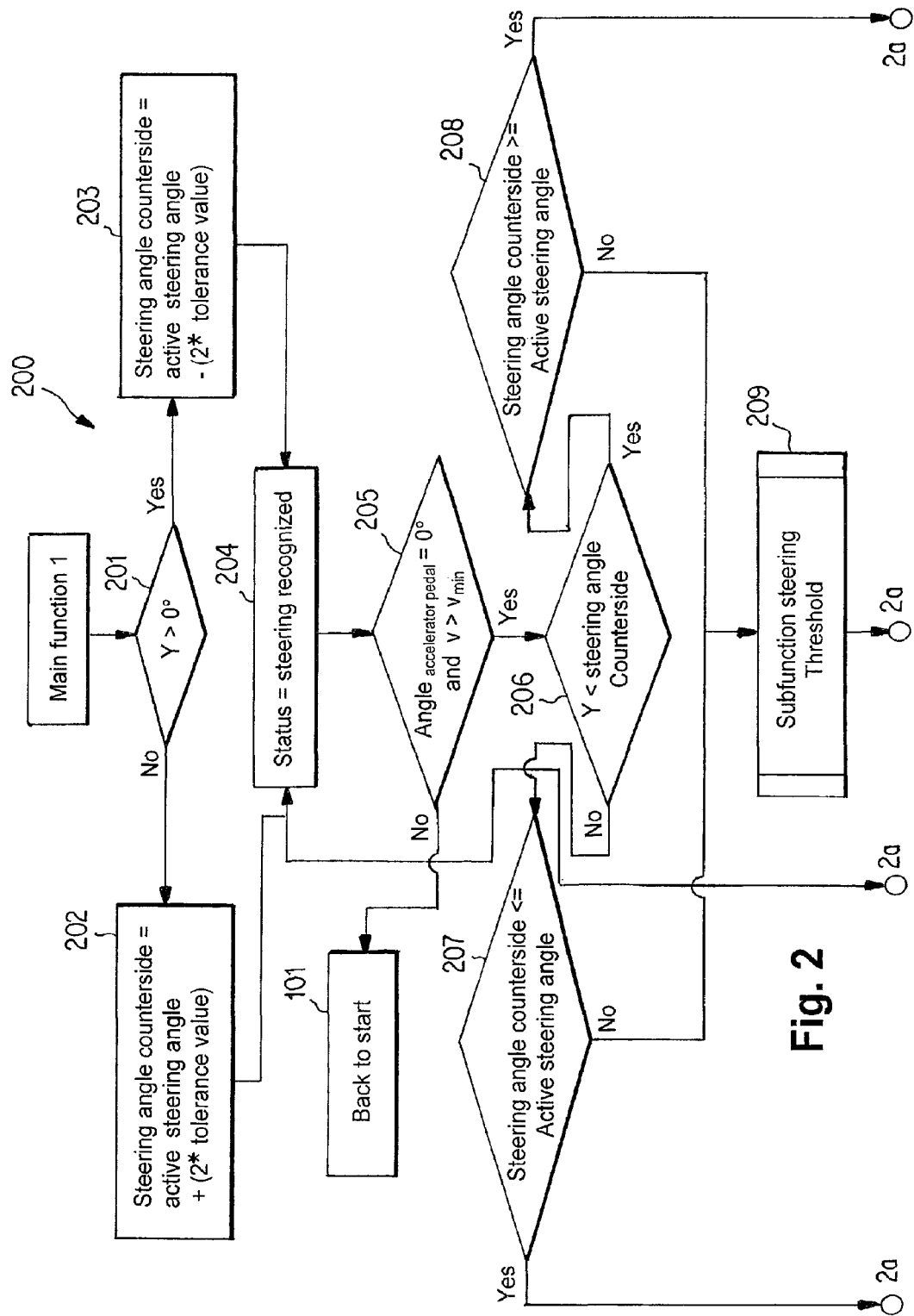
FIG. 2 is a flow chart of the main function 2 or of the second part of the method according to the invention.
Figure 2A:
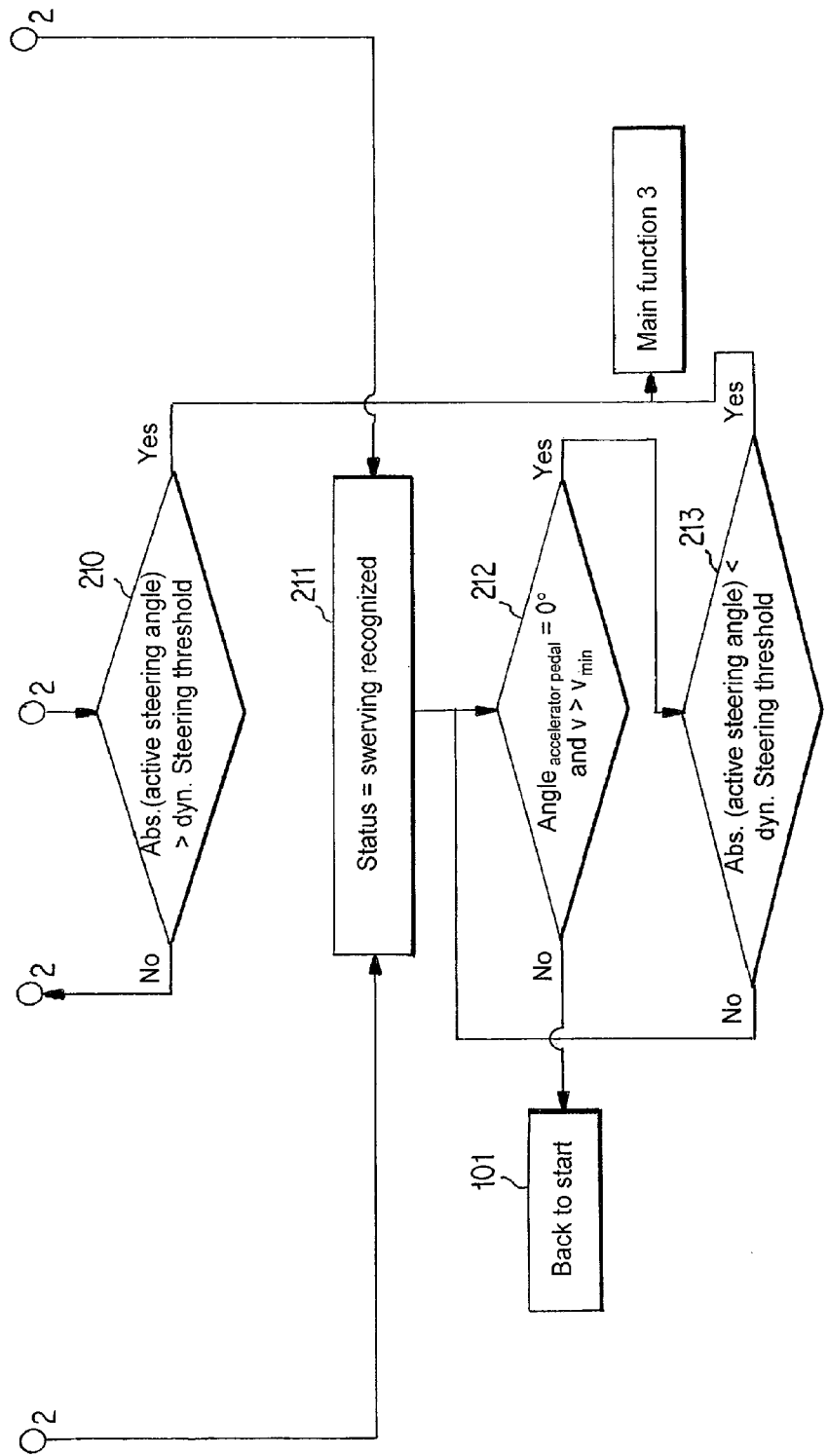

FIG. 2 shows the second part 200 (main function 2) of the method. In the second part 200, it is determined in Steps 201 to 211 whether or not the driver is "swerving", which may possibly be another indication of an imminent turning operation. Many—but not all—drivers swerve before a turning operation.

The term "swerving" will first be explained with respect to a straight road. When the driver is following the straight course of the road, the steering wheel will largely remain in its rest position. In a first form of the swerve, the turning at first takes place toward the right clearly beyond the rest position of the steering wheel and then toward the left clearly beyond the rest position. In the case of right-hand traffic, this causes the driver to arrive at the right edge of the road, and the front of the vehicle already points slightly more in the opposite direction than during the straight-ahead drive. In a second form of a swerve, the driver first steers toward the left clearly beyond the rest position of the steering wheel, then toward the right clearly beyond the rest position.

During swerving, when the vehicle is, for example, moving along a left bend, the road, as it were, moves toward the left under the vehicle—in contrast to a straight road. During a normal cornering, the steering wheel is turned corresponding to the curvature of the bend with respect to the 0 position; i.e., in the case of a left-hand bend, the steering angle is smaller than 0 degrees and, in the case of a right-hand curve, it is greater than 0 degrees.

In order to be able to also recognize a swerving when cornering, it is checked in Step 201 whether the steering angle y is greater than 0 degrees. If the answer is "no", the following applies: Steering angle counterside=steering angle+(2*tolerance value); i.e., Status 202. If the answer is "yes", the following applies: Steering angle counterside=steering angle−(2*tolerance value); i.e., Status 203. In both cases, the "Status=steering recognized" 204 applies.

In Step 205, it is checked again whether the accelerator pedal is not deflected and whether the speed is higher than the predetermined minimal speed. If the answer is "no", the method will start again with "start"; i.e., with Status 101.

If the answer is "yes", it is checked in Step 206 whether the current steering angle y is smaller than the "steering angle counterside" (compare Status 202 and 203). If the answer is "no", it is checked in Step 207, whether the steering angle counterside is smaller than or equal to the current steering angle. If the answer is "yes", this is considered to be a swerving, as indicated in Status 211 "swerving recognized".

If the answer is "yes", it is checked in Step 208, whether the "steering angle counterside" is greater than or equal to the current steering angle. If the answer is "yes", this is considered to be a swerving, as indicated in Status 211. If the result of the comparison in Step 207 or 208 is "no", then the method proceeds through the subfunction "steering threshold" 209 within the scope of the method.

Figure 4:
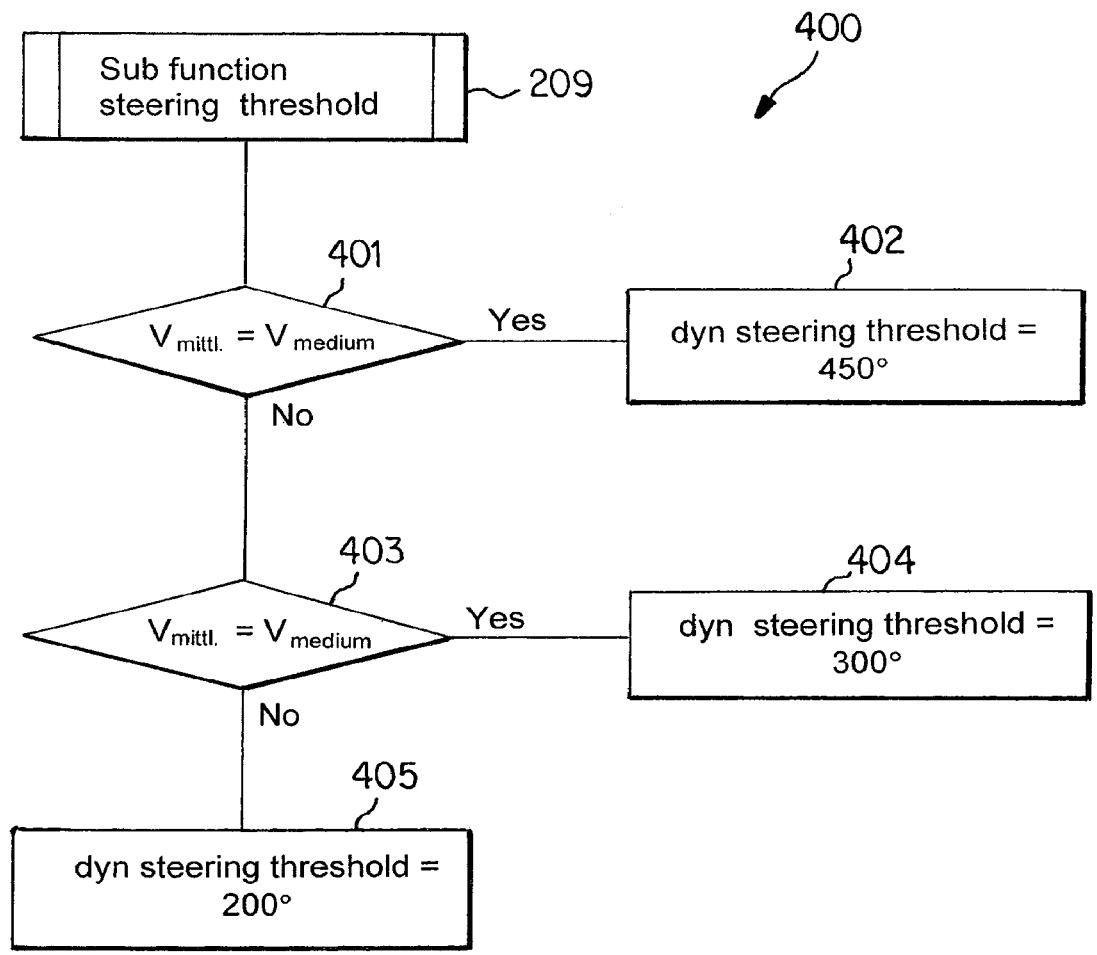
FIG. 4 is a flow chart of the subfunction "steering threshold" of the method according to the invention.

FIG. 4 illustrates the subfunction "steering threshold" 400 of the method, in which a speed-dependent and thus dynamic steering threshold for the further method steps is defined. In Step 401, it is checked whether the average speed of the vehicle over a certain time period is lower than 8 km/h. The time period may, for example, be between 3 and 10 seconds. If the answer is "yes", the dynamic steering threshold is set at 450 degrees (Status 402). When the vehicle is driving straight ahead, i.e., when the steering wheel is not deflected from this position, the angle amounts to 0 or 360 degrees. If the answer is "no", it is checked in Step 403 whether the median speed of the vehicle is less than 15 km/h; i.e. in combination with Step 401, whether the median speed is between 8 km/h and 15 km/h. If the answer is "yes", the dynamic steering threshold is set at 300 degrees (Status 404). If the answer is "no", i.e., the speed is greater than 15 km/h, the dynamic steering threshold is set at 200 degrees.

In Step 210, it is checked whether the absolute value of the current steering angle is greater than the dynamic steering threshold for the current vehicle speed. If the answer is "no", the method will start again with Status 204; i.e., "steering recognized". If the answer is "yes", the method is continued with the main function 3 in FIG. 3.

When a swerving is considered to be recognized (Step 211), it is again checked in Step 212 whether the accelerator or gas pedal is not operated (angle=0 degrees) and whether the speed is greater than the predetermined minimal speed. If the answer is "no", the method will start again with "Start"; i.e. from Status 101. If the answer is "yes", it will be checked in Step 213 whether the absolute value of the current steering angle is greater than the dynamic steering angle threshold. If the answer is "no", the comparison is repeated in Step 212. If the answer is "yes", the Status "countersteering recognized" 301 is present, and the process is continued with the main function 3 illustrated in FIG. 3.

In the third part of the method, which is illustrated in FIG. 3, it is now checked again in Step 302 whether the gas or accelerator pedal is not operated and whether the speed of the vehicle is greater than the predetermined minimal speed. If the answer is "no", the method starts again with "Start"; i.e. from Step 101. If the answer is "yes", then the method proceeds through the subfunction "dynamic turning threshold" 501 illustrated in FIG. 5.

Figure 5:
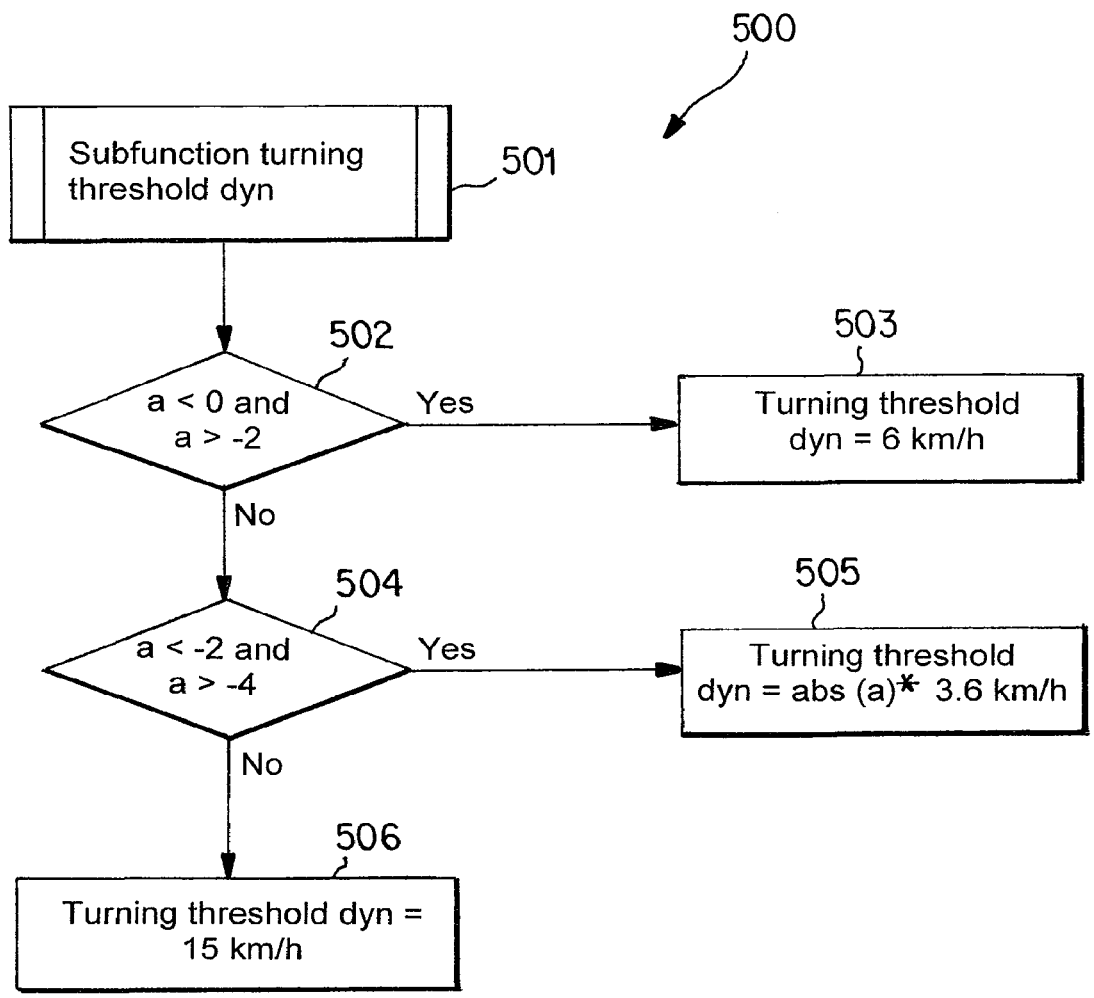
FIG. 5 is a flow chart of the subfunction "dynamic turning threshold".

In the case of the subfunction "dynamic turning threshold" 501 illustrated in FIG. 5, it is checked in Step 502 whether the negative acceleration of the vehicle averaged over the last seconds is between 0 m/s$^2$ and −2 m/s$^2$. If the answer is "yes", the dynamic turning threshold is defined at the value 6 km/h in Step 503. If the answer is "no", it is checked in Step 504 whether the negative acceleration is between −2 m/s$^2$ and −4 m/s$^2$. If the answer is "yes", the dynamic turning threshold will be set to the following value in Step 505: Absolute value of the acceleration times factor 3.6. The result is a speed value. If the answer is "no", the dynamic turning threshold is set to the value of 15 km/h in Step 506.

Figure 3:
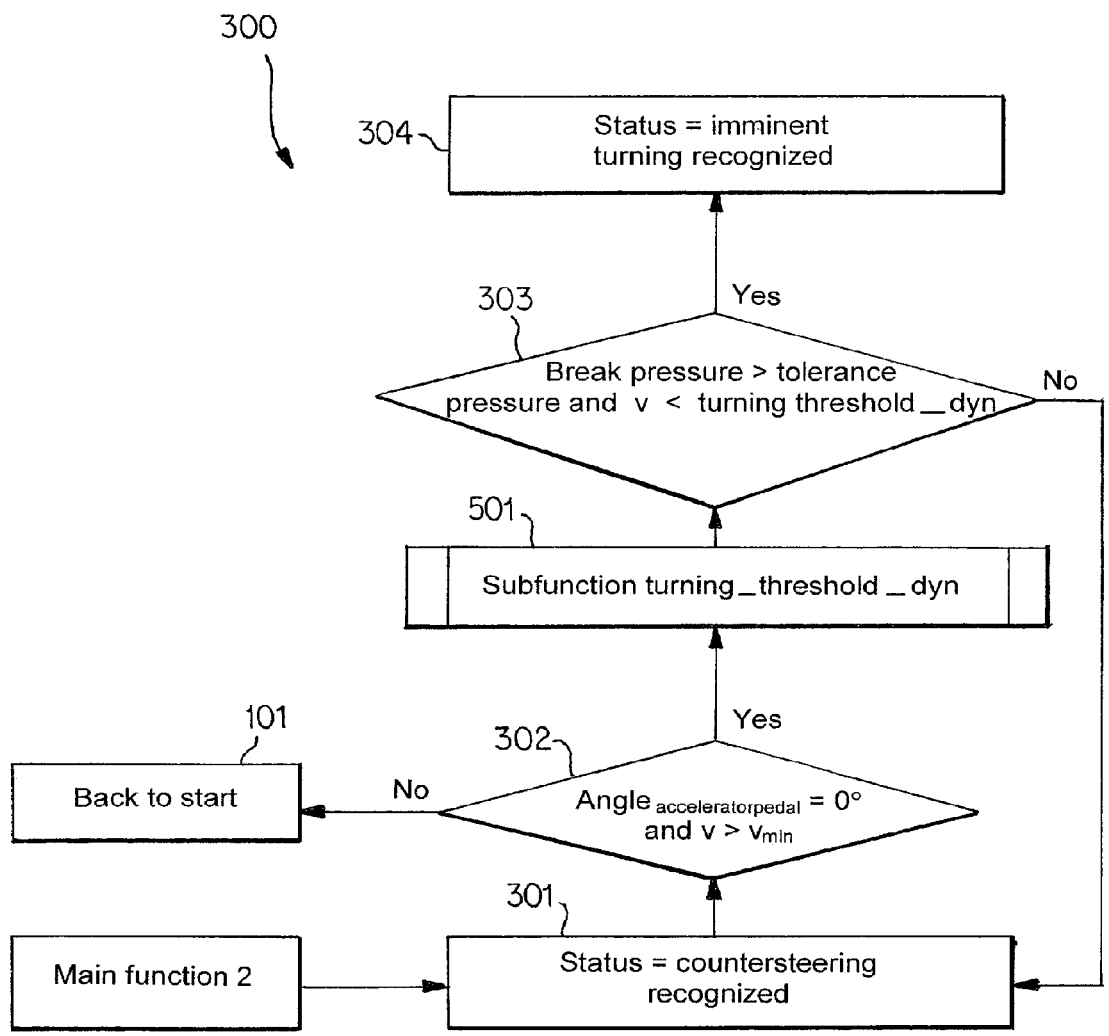
FIG. 3 is a flow chart of the main function 3 or of the third part of the method according to the invention.

After Step 501, it is checked in Step 303 illustrated in FIG. 3 whether the brake pressure is higher than a predetermined tolerance brake pressure. In addition, it is checked whether the current speed of the vehicle v is lower than the dynamic turning threshold set at the subfunction "dynamic turning threshold". If the answer is "no", the method will start again with Step 301 in FIG. 3.

If the answer is "yes", the "status imminent turning" applies in Step 304. By means of Step 304, the on-board power supply voltage and/or the on-board power is raised on time, i.e., before the current turning maneuver, to the voltage level and/or power level required for the turning. During the turning operation, a sufficiently high electric voltage and/or electric power will then be available to the electric steering system of the motor vehicle, and an otherwise existing sluggishness of the steering system, which is unpleasant for the driver, will not occur as a result of the method.

It is understood that the invention can also be implemented in a worsened embodiment, in which the voltage and/or power level will be raised earlier in the course of the method according to the invention. However, this may increase the risk of a "false alarm"; i.e., the voltage and/or power level will then sometimes be raised without an actual future demand, and the energy savings will be reduced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of reducing energy consumption in a motor vehicle having at least one electric on-board power supply system to which at least one electric consuming device is operatively coupled, the method comprising the acts of:

maintaining at least one of a voltage level and power level of the electric on-board power supply system at a first level during a first operating condition of the motor vehicle;

temporarily raising the at least one of the voltage level and power level of the electric on-board power supply system to a second, higher, level in a second operating condition of the motor vehicle; and causing the at least one of the voltage level and power level of the electric on-board power supply system to be temporarily raised to the second, higher level upon recognizing, in advance, an imminent special driving situation by a driving situation detection device operatively arranged in the vehicle based upon a preceding behavior of at least one of a driver controlling the vehicle and of the vehicle.

2. The method according to claim 1, wherein the at least one electric consuming device is an electrically operated steering system of the vehicle, and wherein the imminent special driving situation is a turning operation.

3. The method according to claim 1, wherein the act of causing further comprises the acts of:
detecting a position of an acceleration or gas pedal by way of the driving situation detection device;
detecting at least one additional driving situation; and
temporarily increasing the at least one of the voltage level and power level when the accelerator or gas pedal is substantially in a rest position and the at least one additional driving situation occurs.

4. The method according to claim 2, wherein the act of causing further comprises the acts of:
detecting a position of an acceleration or gas pedal by way of the driving situation detection device;
detecting at least one additional driving situation; and
temporarily increasing the at least one of the voltage level and power level when the accelerator or gas pedal is substantially in a rest position and the at least one additional driving situation occurs.

5. The method according to claim 1, wherein the causing act further comprises the acts of:
detecting an acceleration and a speed of the vehicle by the driving situation detection device;
detecting when at least one additional driving situation occurs; and
temporarily increasing the at least one of the voltage level and power level when the acceleration of the vehicle is negative, the speed of the vehicle falls below a predetermined threshold value, and the at least one additional driving situation occurs.

6. The method according to claim 2, wherein the causing act further comprises the acts of:
detecting an acceleration and a speed of the vehicle by the driving situation detection device;
detecting when at least one additional driving situation occurs; and
temporarily increasing the at least one of the voltage level and power level when the acceleration of the vehicle is negative, the speed of the vehicle falls below a predetermined threshold value, and the at least one additional driving situation occurs.

7. The method according to claim 1, wherein the causing act further comprises the acts of:
detecting a steering angle of an electric steering system of the vehicle by the driving situation detection device;
detecting when at least one additional driving situation occurs; and
temporarily increasing the at least one of the voltage level and power level when an absolute value of the steering angle is greater than a predetermined threshold value and the at least one additional driving situation occurs.

8. The method according to claim 1, wherein the causing act further comprises the acts of:
detecting a steering angle of an electric steering system of the vehicle by the driving situation detection device;
detecting at least one additional driving situation; and
temporarily increasing the at least one of the voltage level and power level when an absolute value of the steering angle is greater than one of a predetermined speed-dependent steering threshold and a steering angle threshold and when at least one additional driving situation occurs.

9. The method according to claim 2, wherein the driving situation detection device checks whether the vehicle is swerving.

10. The method according to claim 1, wherein the driving situation detection device checks whether a brake pressure is higher than a predetermined brake pressure or tolerance pressure, and further checks whether a speed of the vehicle is less than a predetermined acceleration-dependent speed value or a dynamic turning threshold.

11. An on-board power supply system of a motor vehicle, comprising:
at least one electrical load coupled to the on-board power supply system of the motor vehicle; and
a program-controlled driving situation detection device operatively coupled with the on-board power supply system, the on-board power supply system maintaining at least one of a voltage level and power level at a first level during a first operating condition of the motor vehicle and temporarily raising the at least one of the voltage level and power level to a second, higher, level when the driving situation detection device recognizes in advance an imminent special driving situation as a result of a preceding behavior of a driver when controlling the vehicle and/or of the vehicle.

12. The power supply system according to claim 11, wherein the electric load is an electrically operated steering system and the imminent special driving situation is a turning operation of the vehicle.

13. The power supply system according to claim 11, wherein the program-controlled driving situation detection device is programmed to:
detect a position of an acceleration or gas pedal by way of the driving situation detection device;
detect at least one additional driving situation; and
temporarily increase the at least one of the voltage level and power level when the accelerator or gas pedal is substantially in a rest position and the at least one additional driving situation occurs.

14. The power supply system according to claim 11, wherein the program-controlled driving situation detection device is programmed to:
detect an acceleration and a speed of the vehicle by the driving situation detection device;
detect when at least one additional driving situation occurs; and
temporarily increase the at least one of the voltage level and power level when the acceleration of the vehicle is negative, the speed of the vehicle falls below a predetermined threshold value, and the at least one additional driving situation occurs.

15. The power supply system according to claim 11, wherein the program-controlled driving situation detection device is programmed to:
detect a steering angle of an electric steering system of the vehicle by the driving situation detection device;
detect when at least one additional driving situation occurs; and
temporarily increase the at least one of the voltage level and power level when an absolute value of the steering angle is greater than a predetermined threshold value and the at least one additional driving situation occurs.

16. The power supply system according to claim 11, wherein the program-controlled driving situation detection device is programmed to:

detect a steering angle of an electric steering system of the vehicle by the driving situation detection device;
detect at least one additional driving situation; and
temporarily increase the at least one of the voltage level and power level when an absolute value of the steering angle is greater than one of a predetermined speed-dependent steering threshold and a steering angle threshold and when at least one additional driving situation occurs.

17. A program-controlled driving situation detection device for a motor vehicle, comprising a computer-readable medium having stored thereon program code segments that:
   maintain at least one of a voltage level and power level of the electric on-board power supply system at a first level during a first operating condition of the motor vehicle;
   temporarily raise the at least one of the voltage level and power level of the electric on-board power supply system to a second, higher, level in a second operating condition of the motor vehicle; and
   cause the at least one of the voltage level and power level of the electric on-board power supply system to be temporarily raised to the second, higher level upon recognizing, in advance, an imminent special driving situation by a driving situation detection device operatively arranged in the vehicle based upon a preceding behavior of at least one of a driver controlling the vehicle and of the vehicle.

* * * * *